Dec. 13, 1932.   J. A. LANDIS   1,890,788
DENTAL FLOSS HOLDER
Filed June 16, 1930

Jesse A. Landis Inventor

By C. A. Snow & Co.
Attorneys.

Patented Dec. 13, 1932

1,890,788

UNITED STATES PATENT OFFICE

JESSE A. LANDIS, OF EATON, OHIO

DENTAL FLOSS HOLDER

Application filed June 16, 1930. Serial No. 461,558.

This invention relates to a device for holding short lengths of dental floss in such a way as to facilitate the use of dental floss in cleaning teeth.

An important object of the invention is to provide a tooth brush handle so constructed that a length of dental floss may be readily and easily secured in position to lie in spaced relation with the handle.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
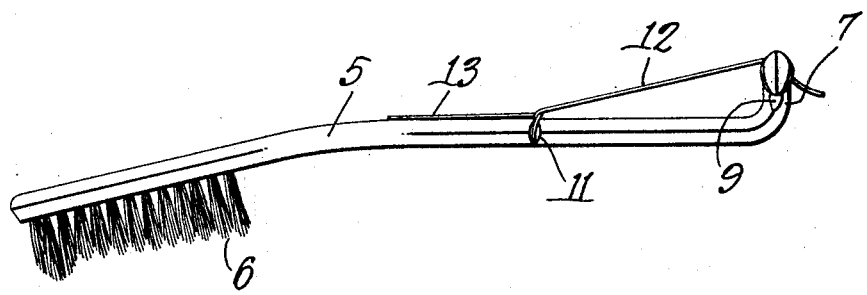
Figure 1 is a side elevational view of a tooth brush handle constructed in accordance with the invention.

Referring to the drawing in detail, the reference character 5 designates a tooth brush handle which is supplied with the usual bristles 6. One end of the handle is extended at right angles as at 7, where the same is provided with the usual opening 8, to permit the tooth brush to be hung on a supporting hook.

Formed in the right angled end 7 of the hook, is a notch 9, the open portion of the notch being disposed downwardly. A notch 10 is formed in the extremity of the right angled portion 7, the side portion of the notch being disposed outwardly.

Formed in the side edges of the handle, and disposed intermediate the ends thereof, are notches 11, the notches 11 cooperating with the notches 9 and 10 to hold the length of dental floss on the handle.

Figure 2:
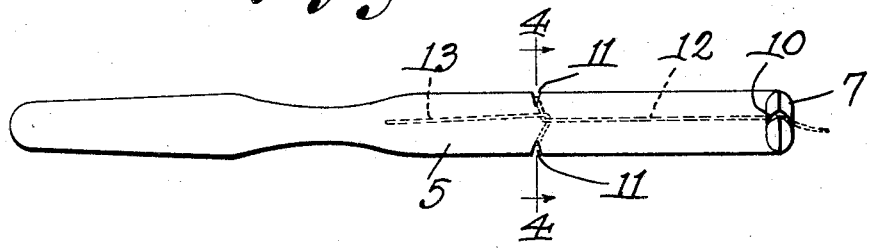
Figure 2 is a plan view thereof.
Figure 3:
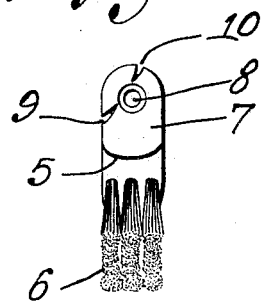
Figure 3 is an end elevational view of the tooth brush handle.
Figure 4:
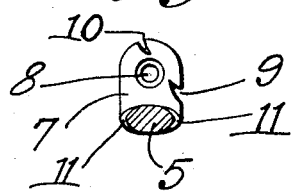
Figure 4 is a sectional view taken on line 4—4 of Figure 2.

The length of dental floss is indicated by the reference character 12, and as shown the dental floss is positioned in the notch 10, near one end of the dental floss, from where the dental floss is carried downwardly and passed around the outer end of the right angled portion overlying that portion of the dental floss resting within the notch 10. The dental floss is now positioned around the handle 5 in a manner as shown in dotted lines in Figure 2, the end 13 of the dental floss being passed under the main portion of the dental floss adjacent to the loop, so that the free end of the dental floss may be held against the handle, by the finger of the user. In this way the dental floss will be held taut, and may be readily and easily removed, without the necessity of tying the dental floss on the handle.

Due to the construction shown and described, it will be obvious that the dental floss will be held in such spaced relation with the handle, as to permit the same to be readily and easily passed between the teeth, in order to dislodge or remove foreign matter.

I claim:

A tooth brush handle comprising a body portion, one end of the body portion extending at right angles with respect to the main portion of the handle and having a notch, said right angled portion having a notch formed in the side edge thereof, said notches adapted to receive one end of a length of dental floss, said handle having notches in the opposite side edges thereof at points intermediate the ends of the handle, said notches adapted to receive the dental floss which is looped around the handle, said handle having a flat surface against which the dental floss is pressed by the finger of the user, removably securing the dental floss in position.

In testimony that I claim the foregoing as my own, I have hereto affixed my signature.

JESSE A. LANDIS.